US006983976B2

(12) United States Patent
Reinsch

(10) Patent No.: US 6,983,976 B2
(45) Date of Patent: Jan. 10, 2006

(54) CABRIOLET VEHICLE WITH FACILITATED LOADING

(75) Inventor: Burkhard Reinsch, Kaufbeuren (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 180 days.

(21) Appl. No.: 10/396,697

(22) Filed: Mar. 26, 2003

(65) Prior Publication Data

US 2003/0197395 A1 Oct. 23, 2003

(30) Foreign Application Priority Data

Mar. 26, 2002 (DE) ........................................ 102 13 548

(51) Int. Cl.
*B60J 7/12* (2006.01)
*B60J 7/20* (2006.01)

(52) U.S. Cl. ............... 296/107.08; 296/76; 296/107.17; 296/136.02

(58) Field of Classification Search ............ 296/107.08, 296/76, 107.17, 112, 115, 136.02
See application file for complete search history.

(56) References Cited

U.S. PATENT DOCUMENTS

| | | | | |
|---|---|---|---|---|
| 5,558,389 A | * 9/1996 | Rothe et al. | ........... | 296/107.08 |
| 5,975,619 A | * 11/1999 | Dettling et al. | ........ | 296/107.08 |
| 6,010,178 A | * 1/2000 | Hahn et al. | ............ | 296/107.08 |
| 6,164,713 A | * 12/2000 | Graf et al. | ............. | 296/107.08 |
| 6,193,300 B1 | * 2/2001 | Nakatomi et al. | ..... | 296/107.08 |
| 6,511,118 B2 | * 1/2003 | Liedmeyer et al. | .... | 296/107.17 |
| 6,595,572 B2 | * 7/2003 | Schuler et al. | ......... | 296/107.08 |
| 6,604,775 B2 | * 8/2003 | Obendiek | .................. | 296/108 |
| 6,616,213 B2 | * 9/2003 | Koch | .................... | 296/107.08 |
| 6,702,361 B2 | * 3/2004 | Russke | .................. | 296/107.08 |
| 6,705,662 B2 | * 3/2004 | Sande | ................... | 296/107.08 |
| 6,705,663 B2 | * 3/2004 | Zipperle | ................ | 296/136.06 |

FOREIGN PATENT DOCUMENTS

| | | |
|---|---|---|
| DE | 195 40 819 A1 | 5/1997 |
| DE | 299 16 002 U1 | 2/2001 |
| DE | 199 60 010 C1 | 11/2001 |
| DE | 100 39 680 A1 | 3/2002 |

* cited by examiner

*Primary Examiner*—D Glenn Dayoan
*Assistant Examiner*—Greg Blankenship
(74) *Attorney, Agent, or Firm*—Nixon Peabody LLP; David S. Safran

(57) ABSTRACT

A cabriolet vehicle with a convertible top (12), a stowage space (58) which uses part of the trunk space (60), and a convertible top hatch (30) formed as part of the trunk lid (34), in which the convertible top (12) can be moved between a closed position in which it covers the passenger compartment (14), and a stowage position in which it is held as a folded package in the stowage space (58) which is covered by the convertible top hatch (30). The position of the convertible top (12) can be adjusted upward into an intermediate position by moving the convertible top hatch (30). In the intermediate position, the folded package extends out of the stowage space (58), for providing increased access to the trunk space. The convertible top hatch (30) can be pivoted around a first pivoting device (40, 42, 44) for opening of the stowage space, and the trunk lid (34) can be pivoted around a second pivoting device (38) independently of the convertible top hatch (30) for opening the trunk (60).

16 Claims, 8 Drawing Sheets

CABRIOLET VEHICLE WITH FACILITATED LOADING

BACKGROUND OF THE INVENTION

1. Field of the Invention

The invention relates to a cabriolet vehicle with a convertible top, a stowage space which uses part of the trunk space, and a convertible top hatch which encompasses the trunk lid, and the convertible top being movable between a closed position in which it covers the passenger compartment, and a stowage position in which it is held as a folded package in the stowage space which is covered by the convertible top hatch, and the convertible top upon clearance of the stowage space opening, being adjusted by moving the convertible top hatch from a loading position farther into an intermediate position in which it projects as a folded package out of the stowage space.

2. Description of Related Art

A motor vehicle of the initially mentioned type is known from German Patent DE 199 60 010 C1. There, a folding convertible top is shown in which a convertible top part is coupled via a parallelogram-connecting rod drive to a bearing bracket which is pivotally attached to the motor vehicle. The pivot axes of the parallelogram connecting rod and the pivot axis of the bearing bracket are parallel to one another. A hydraulic cylinder is coupled to the bearing bracket and has a piston rod which is connected to one of the connecting rods of the parallelogram-connecting rod drive. The bearing bracket itself can in turn be pivoted via a hydraulic cylinder which is coupled to the motor vehicle.

In the folding convertible top known from DE 199 60 010 C1 the residual trunk space which is not required by the convertible top in the stowage position is more easily accessible when the convertible top is located as a folded package in the intermediate position.

The disadvantage in this approach is that the indicated convertible top kinematics requires a complex structure and the convertible top in the intermediate position must be held by the hydraulic cylinders; this can lead to unforeseeable problems when the hydraulic system fails.

SUMMARY OF THE INVENTION

The primary object of the invention is to improve the known folding convertible top and thus to overcome the indicated disadvantages.

The invention is based on the prior art in that, for opening of the stowage space, the convertible top hatch can be pivoted around a first pivoting device, and that the trunk lid can be pivoted around a second pivoting device independently of the convertible top hatch for opening the trunk. The first and/or the second pivoting device can be formed, for example, by a four-bar or multibar linkage.

This invention can fundamentally be accomplished with all types of convertible tops. This invention is used most advantageously on folding hardtops with roof elements of stable shape, since they are bulky as a folded package and occupy a considerable volume; this often makes it difficult to load the remaining trunk space.

The kinematics of the convertible top hatch and of the trunk lid which is connected to it leads to the fact that the convertible top can be attached with a simple structure to the cabriolet vehicle.

This invention is furthermore based on the prior art in that the convertible top, in an intermediate position can be locked against motion out of this position and/or that the convertible top hatch in its loading position can be locked against motion out of this position.

This results in that the indicated components, in their assigned positions, are held independently from the assigned drives, so that failure of the drive does not lead to motion of one of the components, and thus, to a damaging collision between them. It is expressly indicated that the feature of a locking capacity can also be implemented in combination with one or more of the aforementioned features.

For example, the cabriolet vehicle can be made in a structurally simple manner which is economical in production engineering, such that the convertible top is connected to the motor vehicle via a convertible top-connecting rod mechanism which is coupled to the vehicle, that the convertible top hatch is connected to the motor vehicle via the hatch-connecting rod mechanism which is coupled to the motor vehicle, and that the trunk lid is coupled via the lid-connecting rod mechanism which is coupled to the convertible top hatch.

This construction makes it possible for the convertible top-, the hatch- and the lid-connecting rod mechanisms to be movable independently of one another. Alternatively, it is also possible to couple the connecting rod mechanisms to one another to prevent collisions of the individual components.

Since the pivot bearing bracket which is utilized in the prior art can be omitted, the convertible top and the convertible top hatch can also be very easily driven in that a connecting rod of the convertible top-connecting rod mechanism, which rod is connected to the vehicle, and a connecting rod of the hatch-connecting rod mechanism, which rod is coupled to the vehicle, are connected to a respective drive device which is supported securely on the vehicle.

Movability of the convertible top and convertible top hatch independently of one another can be achieved by correspondingly independent locking of the indicated components. This can be implemented, for example, in that on the convertible top and on the convertible top hatch, preferably on the convertible top- and the hatch-connecting rod mechanisms, especially preferably on the assigned drive devices, there is at least one locking mechanism on each. Alternatively, to save money and to reduce production cost there, can also be at least one locking mechanism only on the convertible top or convertible top hatch, for example, if these components are coupled for common motion.

Locking can be guaranteed independently of an external power supply in that the locking mechanism of the convertible top and/or the convertible top hatch is made as a catch mechanism and is provided with a catch element which is pre-tensioned in the catch direction. One especially favorable construction is achieved by the catch mechanism of the convertible top and/or of the convertible top hatch each making ready a surmountable catch. Then, catching can be achieved by the force of the drive device or drive devices.

If locking is not attainable by the force of the convertible top and/or the convertible top hatch drive, the convertible top system can be made such that, on the catch mechanism of the convertible top and/or convertible top hatch, there is a release device, especially a switchable magnet, for releasing the catch.

Alternatively, it is also possible for the locking mechanism of the convertible top and/or the convertible top hatch to have a locking element which is adjustable by a regulating device between the locking position and the release position.

This offers the possibility of designing the locking element to accommodate especially high forces, and thus, to more reliably avoid unintentional movements of the convertible top and/or convertible top hatch.

Another safety aspect is to prevent pinching of body parts of, for example, an individual loading or unloading the remaining trunk space. This can be achieved, on the one hand, in the form of mechanical covers of the moving mechanism parts. On the other hand, it is also possible to prevent pinching by the drive devices of the convertible top and/or convertible top hatch, by driving the components assigned to it for movement out of the intermediate position or out of the loading position only with a continuously activated actuating element which is located preferably in the trunk space.

As follows from the description above, the convertible top system comprised of a convertible top, stowage space and convertible top hatch forms an essential component of the cabriolet vehicle in accordance with the invention. Therefore independent protection is sought for this convertible top system.

The invention will now be explained with reference to the accompanying drawings using preferred embodiments.

DETAILED DESCRIPTION OF THE INVENTION

Figure 1:
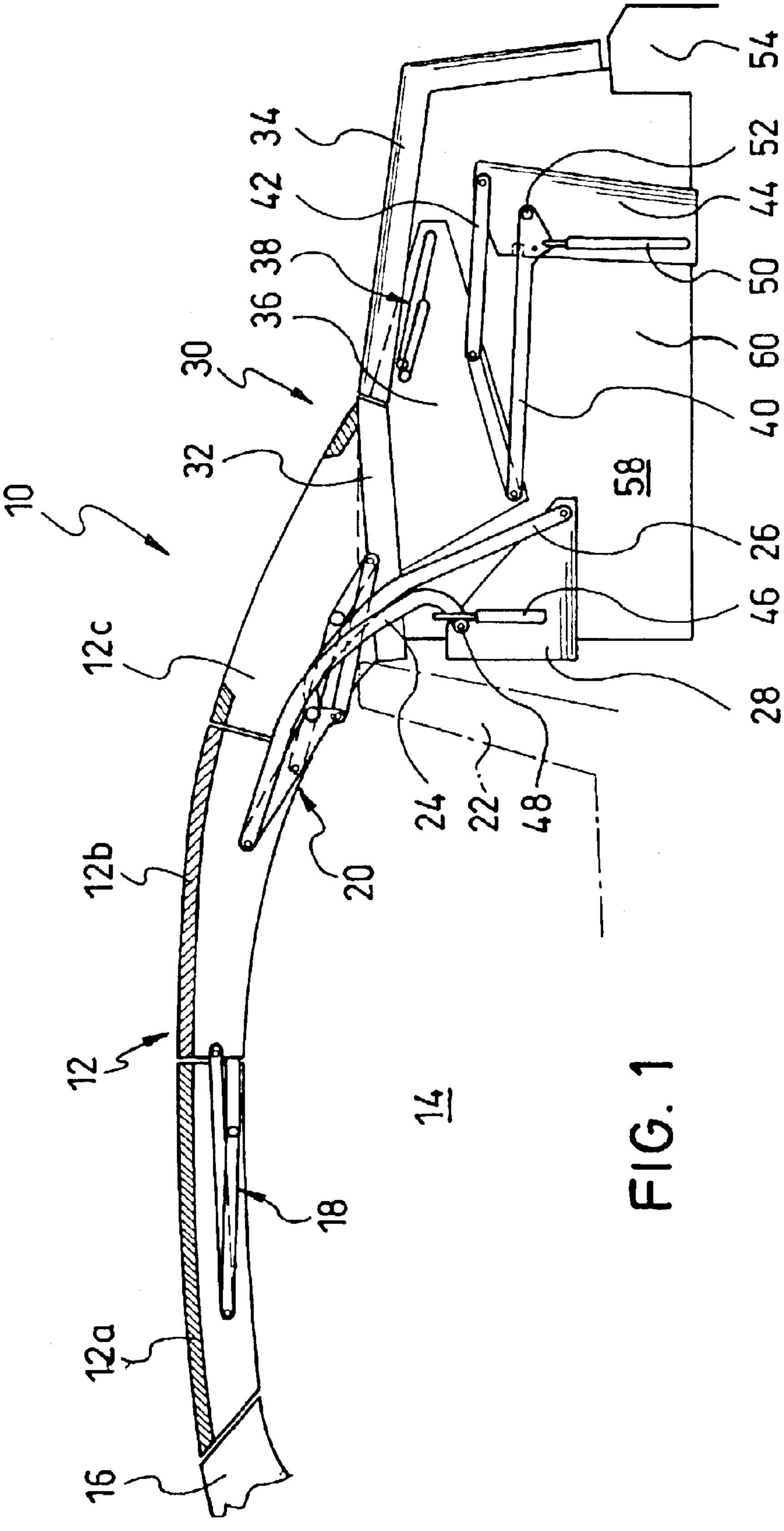
FIG. 1 is a schematic side view of a motor vehicle in accordance with the invention with a three-part hardtop convertible top in the closed position.

In FIG. 1, a motor vehicle 10 in accordance with the present invention has a three-part hardtop 12 is located in the closed position in which it spans the passenger compartment 14. In this position, the front roof part 12*a* adjoins a transverse roof brace 16 which borders a front windshield (not shown). The front roof part 12*a* is connected to the middle roof part 12*b* via a connecting rod mechanism 18, while the middle roof part 12*b* is connected to the rear roof part 12*c* via a connecting rod mechanism 20. A seat 22 is shown in the passenger compartment 14 by dot-dash lines for orientation. The hardtop 12 is coupled to a vehicle-mounted convertible top bearing 28 with a first connecting rod 24 and with a second connecting rod 26. With their ends away from the convertible top bearing 28, the connecting rods 24 and 26 are coupled to the connecting rod mechanism 20.

The motor vehicle 10 in accordance with the invention, according to one aspect of the invention, furthermore, has a convertible top hatch 30 with a hat rest part 32 and a trunk lid 34. The hat rest part 32 is located on the support frame 36 on which the trunk lid 34 is located to be able to move via a four-bar linkage 38, especially to be able to swing around an axis which runs essentially in the transverse direction of the vehicle.

The support frame 36 is coupled to the vehicle-mounted convertible top hatch bearing 44 via two connecting rods 40 and 42.

For the convertible top, the connecting rod 24 is driven by a piston-cylinder unit 46 which is connected to the convertible top bearing 28 pivot around a point 48.

Similarly, the connecting rod 40 is driven via a piston-cylinder unit 50 which is attached to the convertible top hatch bearing 44 pivot around a point 52. A rear shock absorber 54 of the vehicle is shown for orientation.

Figure 2:
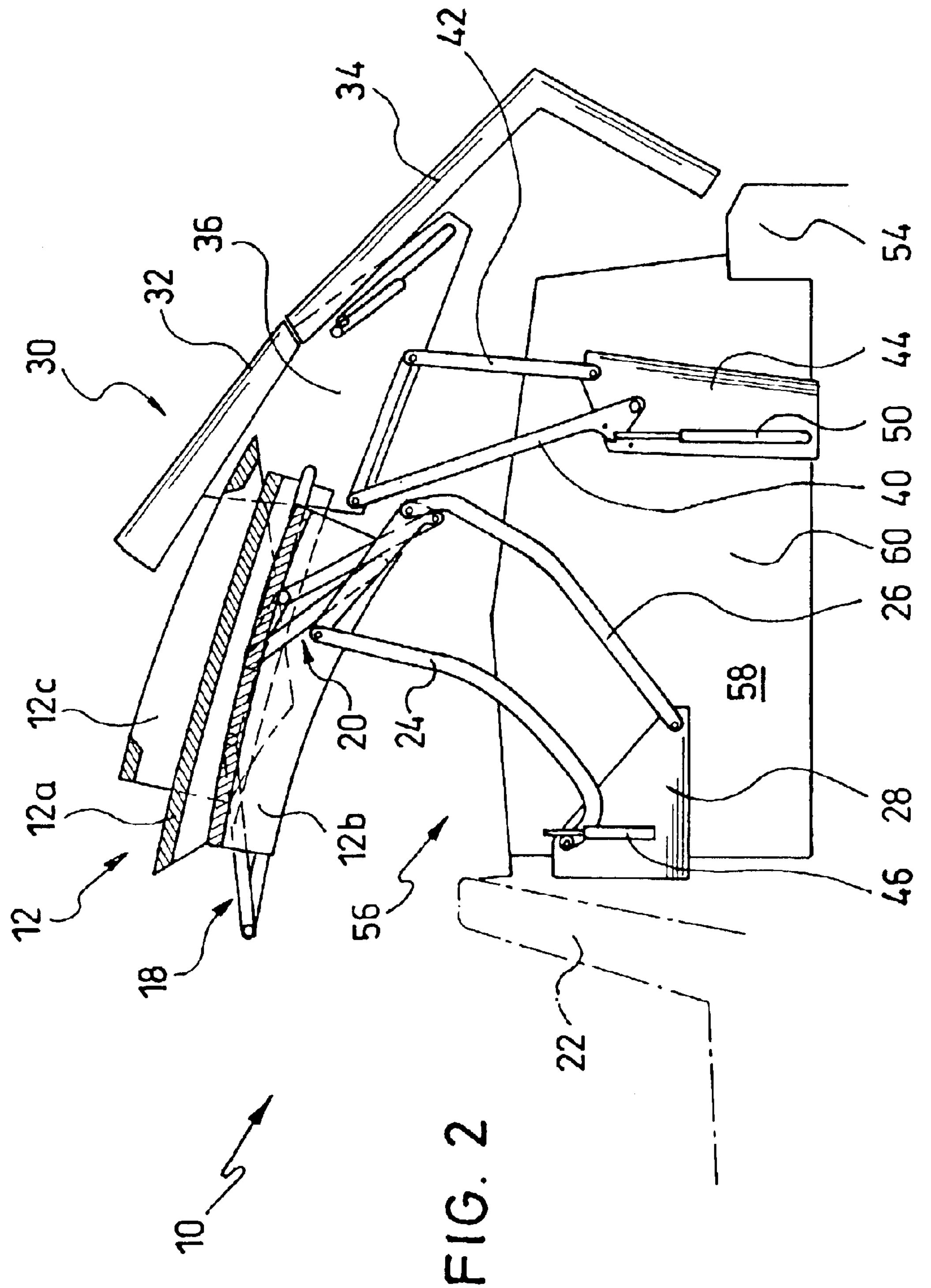
FIG. 2 shows the motor vehicle from FIG. 1 during stowage of the convertible top.

In FIG. 2, the hardtop 12 has been moved into a folded package in which the roof parts 12*a* to 12*c* are located on top of one another in order to occupy a volume of space that is as small as possible.

The convertible top hatch 30 is raised and swung to the vehicle rear by pivoting the connecting rods 40, 42, by which it clears a stowage opening 56. Access to the stowage space 58, which forms part of the trunk 60, for the hardtop 12 which has been moved into the folded package, is enabled through the stowage opening 56.

Figure 3:
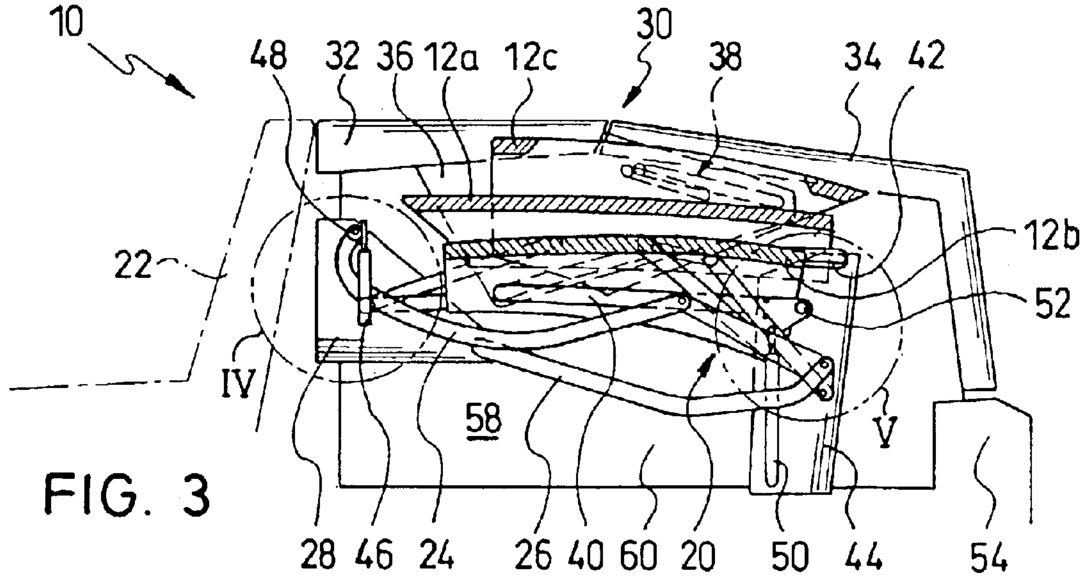
FIG. 3 shows the motor vehicle from FIG. 1 with the convertible top stowed in the stowage space.

In FIG. 3, the roof 12 is ultimately accommodated, as a folded package, in the stowage space 58 and the convertible top hatch 30 closed over it.

Figure 4:
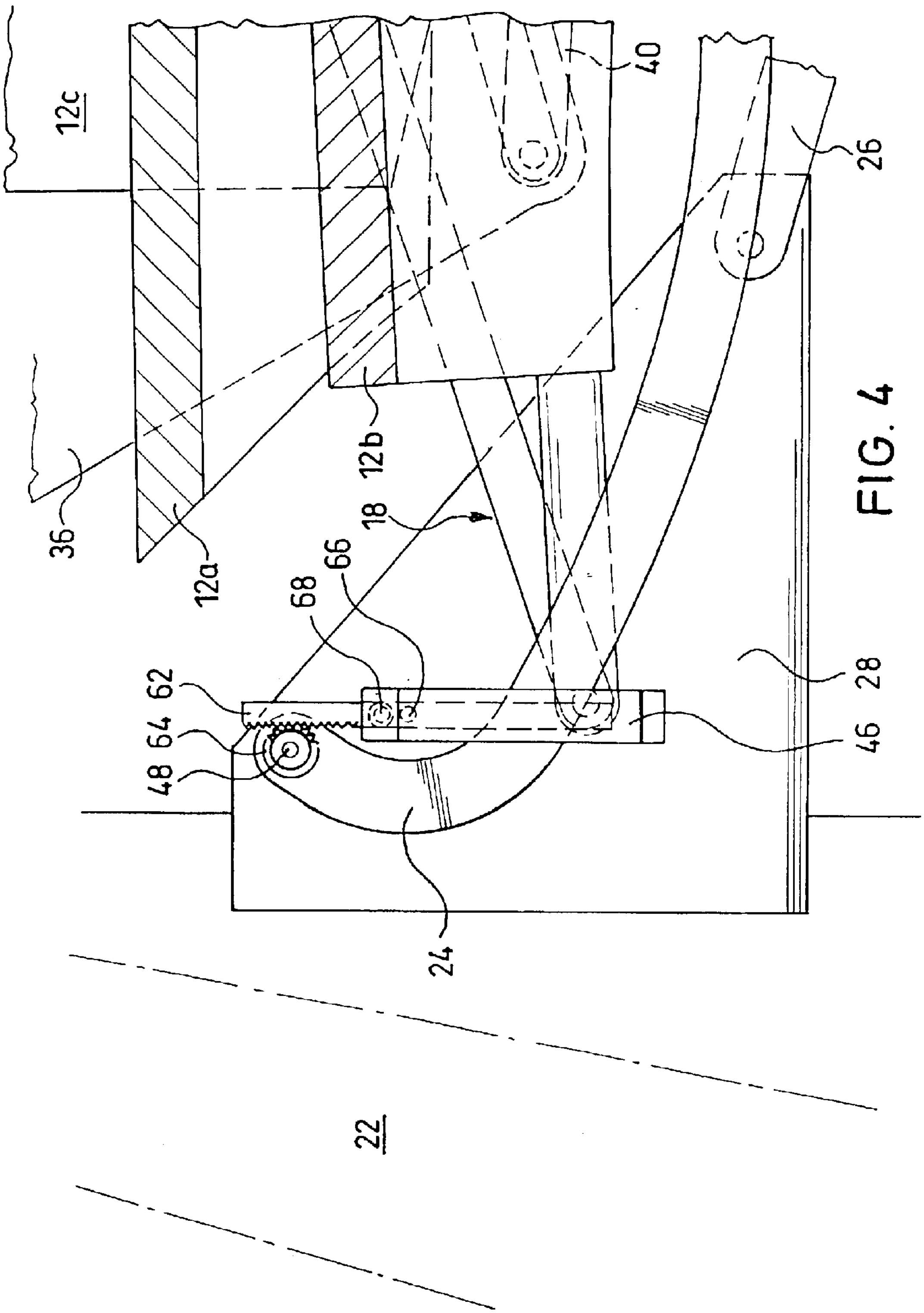
FIG. 4 shows an enlarged view of the area IV in FIG. 3.

FIG. 4 shows an enlarged extract of the area labeled IV in FIG. 3.

The piston 62 of the piston-cylinder unit 46, according to one aspect of the invention, is provided on a side, preferably on the side facing towards the pivot point 48, with a rack which meshes with a gear 64 which is permanently connected to the connecting rod 24 and which has the pivot point 48 at its center.

On the piston 62, there is a spring-loaded catch element 66 which can lock with the catch recess 68. The catch recess 68 is made in the inside wall of the cylinder of the piston-cylinder unit 46 near the end on the piston outlet side. In FIG. 4, the piston 62 is retracted into the cylinder. Alternatively, the catch recess 68 can also be located on the convertible top bearing 28. In addition, there can also be a catch element 66 on one of the connecting rods 24 or 26.

Figure 5:
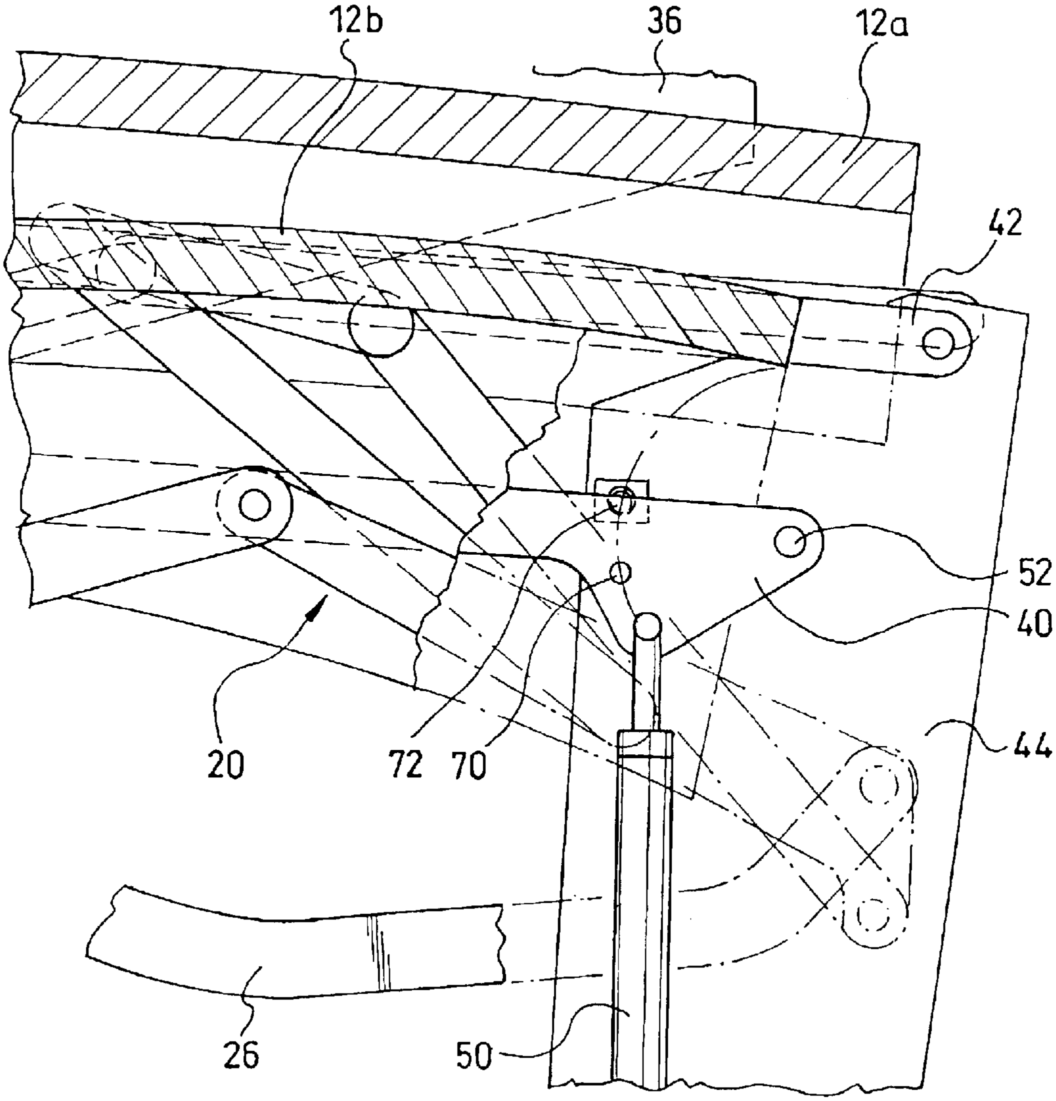
FIG. 5 shows an enlarged view of the area V in FIG. 3.

FIG. 5 shows enlarged the area labeled V in FIG. 3.

The connecting rod 40 has a locking recess 70 into which a locking element 72, driven by a magnet (not shown), fits if the locking recess 70 and the locking element 72 are aligned collinearly.

Figure 6:
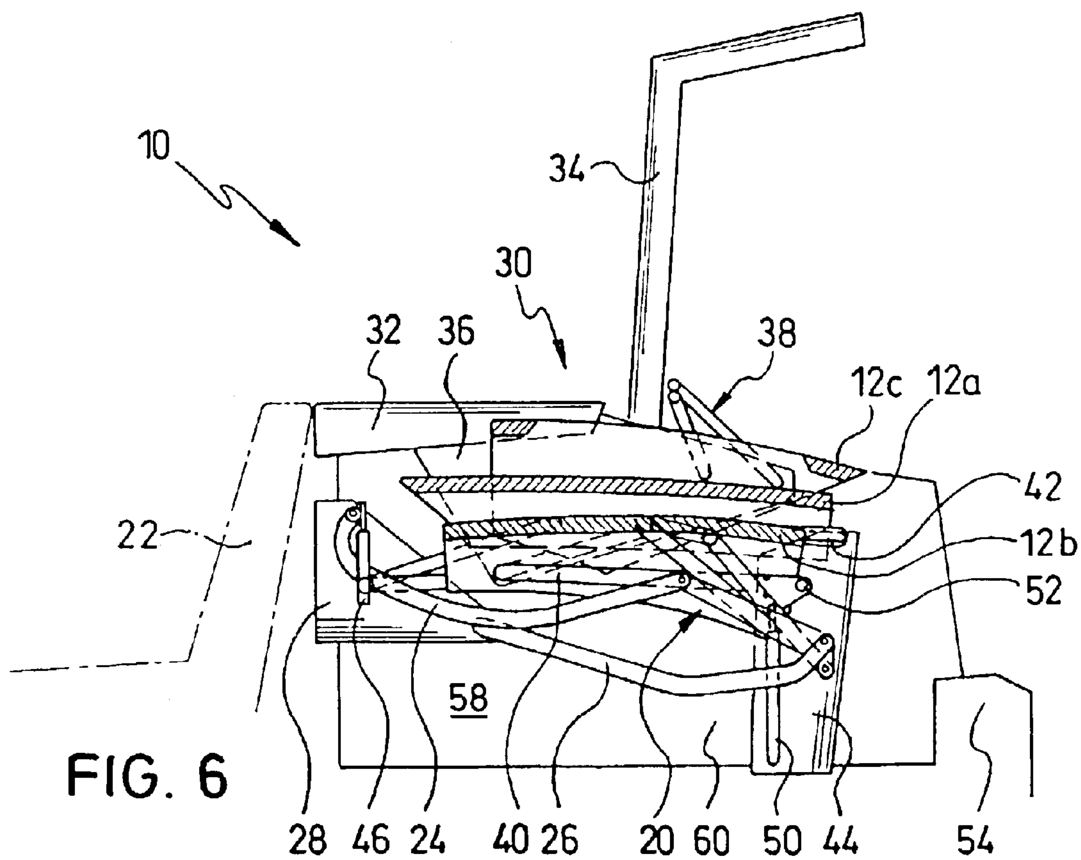
FIG. 6 shows the motor vehicle from FIG. 3 with the trunk lid opened.

The position of the convertible top in FIG. 6 corresponds essentially to that shown in FIG. 3, but with the trunk lid 34 open.

Figure 7:
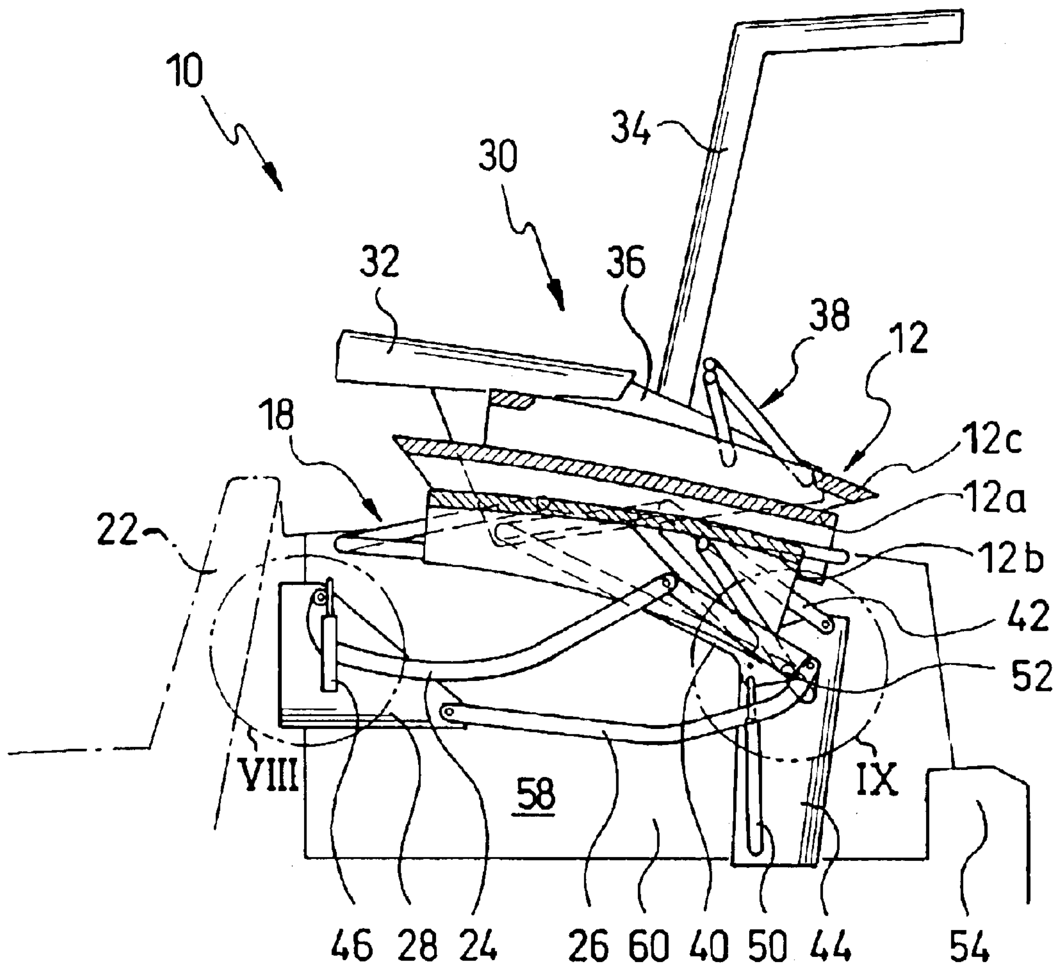
FIG. 7 shows the motor vehicle from FIG. 6 with the convertible top hatch in its loading position and the convertible top in its intermediate position.

In FIG. 7, the convertible top hatch 30 is in its loading position, i.e., it is raised relative to the position shown in FIG. 3, having pivoted counterclockwise around an axis which runs essentially in the transverse direction of the vehicle. The hardtop 12, which has been moved into a folded package, is likewise raised so that a higher loading gap is available for loading of the trunk 60 from the vehicle rear.

Figure 8:
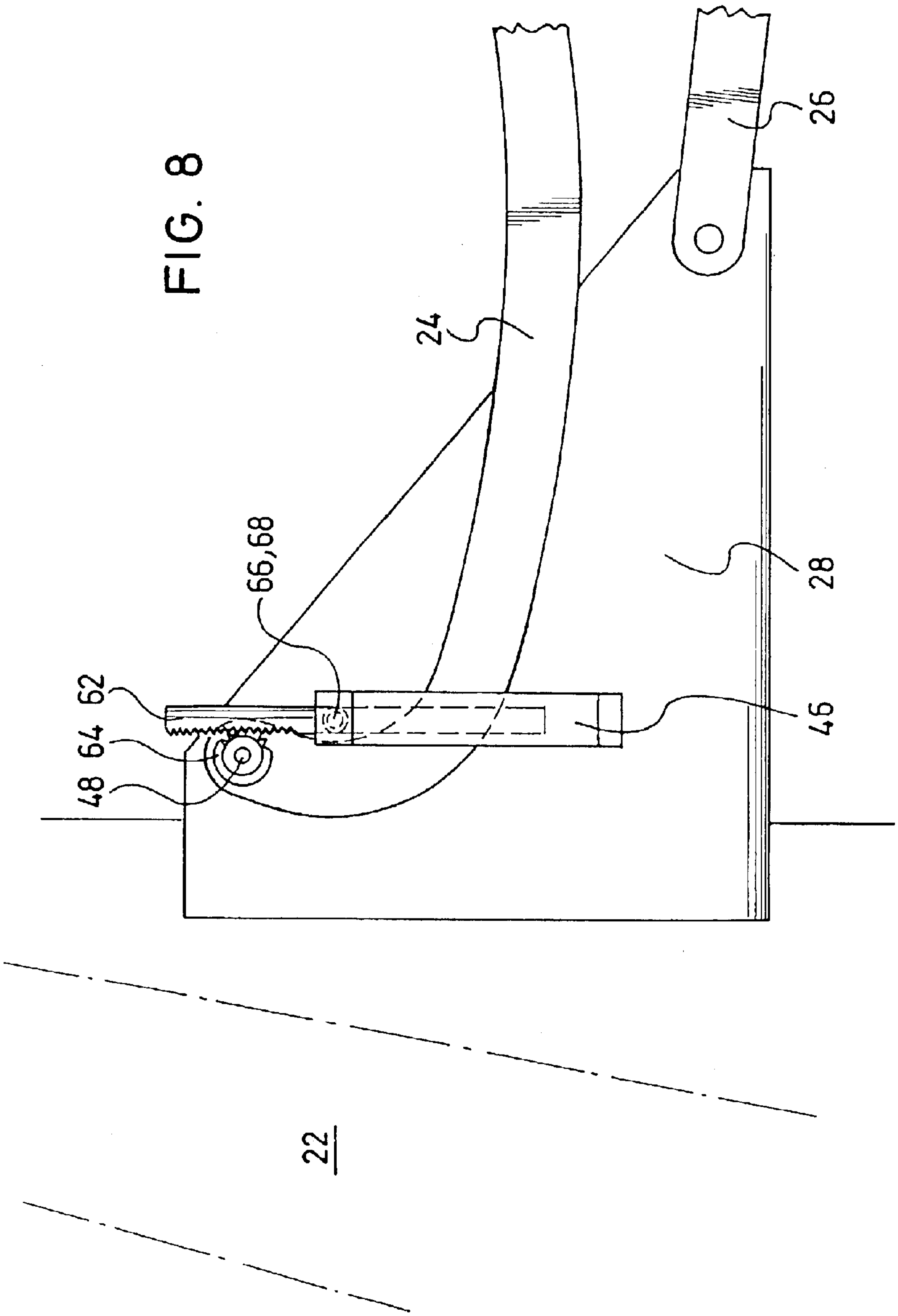
FIG. 8 shows an enlarged extract of the area VIII in FIG. 7
Figure 9:
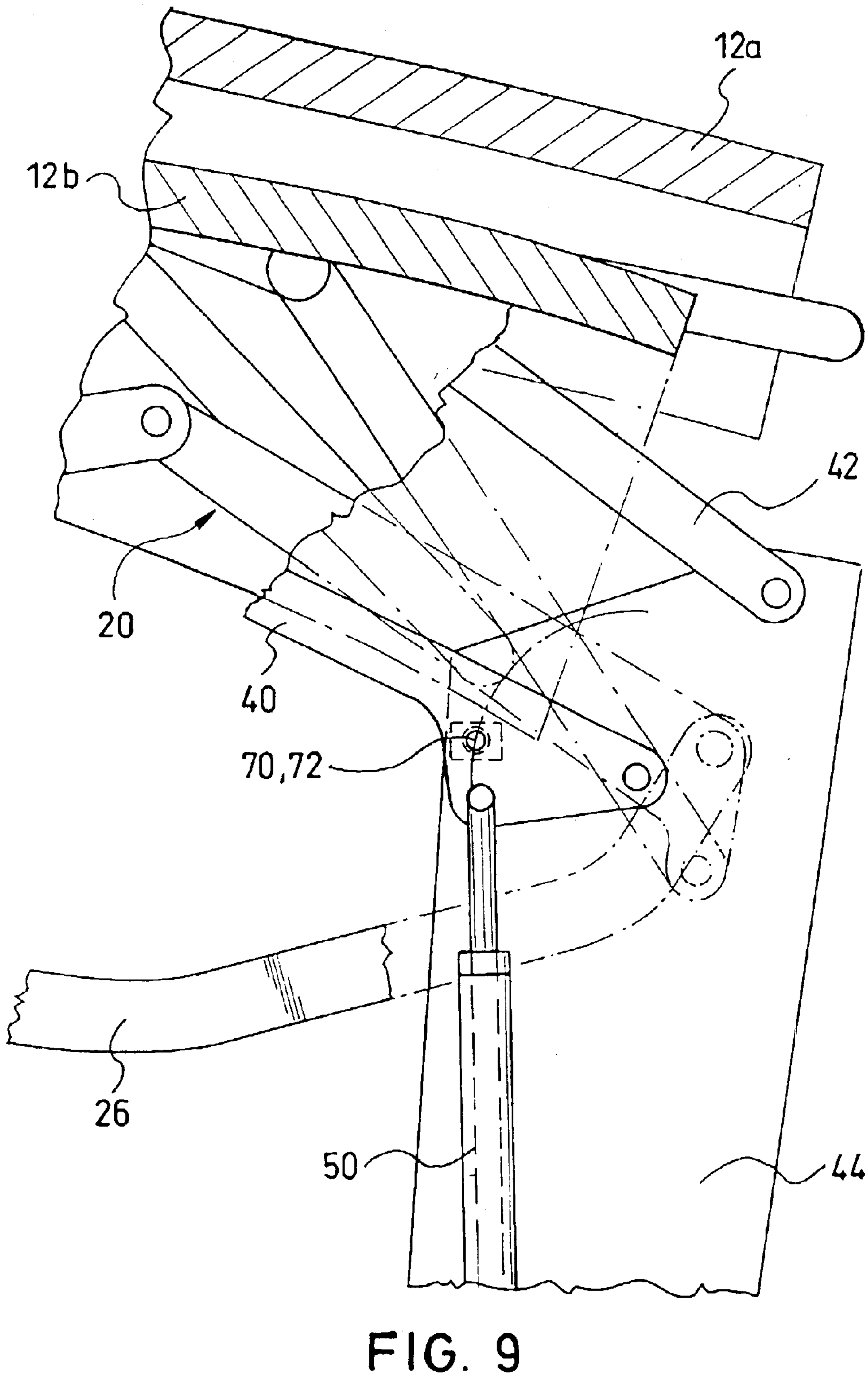
FIG. 9 shows an enlarged extract of area IX in FIG. 7.

It can be seen from the views of FIGS. 8 & 9 that the convertible top, in its intermediate position, is held by catching of the catch element 66 in the catch recess 68 (FIG. 8) and that the convertible top hatch 30 is held in its loading position by the locking element 72 fitting into the locking recess 70.

The features of the invention which are disclosed in the aforementioned description and accompanying drawings and are important both independently and also in any combination for implementation of the invention.

What is claimed is:

1. Cabriolet vehicle, comprising:

a vehicle body having a passenger compartment and a trunk space with a trunk lid, part of the trunk space constituting a stowage space;

a convertible top; and a convertible top hatch forming part of the trunk lid;

wherein the convertible top is movable between a closed position in which it covers the passenger compartment and a stowage position in which the convertible top is held as a folded package in the stowage space covered by the convertible top hatch, wherein the convertible top and convertible top hatch have a trunk loading position in which the folded package and the convertible top hatch are held raised relative to the stowage space so as to provide a higher loading gap for loading of the trunk space; and wherein the convertible top hatch is pivotable by a first pivot device for opening of the stowage space, and wherein the trunk lid is pivotable by a second pivot device independently of the convertible top hatch for opening the trunk.

2. Cabriolet vehicle, comprising:

a vehicle body having a passenger compartment and a trunk space with a trunk lid, part of the trunk space constituting a stowage space;

a convertible top;

a convertible top hatch forming part of the trunk lid; and a convertible top which is movable between a closed position in which it covers the passenger compartment and a stowage position in which the convertible top is held as a folded package in the stowage space covered by the convertible top hatch, the convertible top having an intermediate position in which the folded package is raised through the stowage space opening by moving of the convertible top hatch into a loading position and projects out of the stowage space;

wherein the convertible top hatch is pivotable by a first pivot device for opening of the stowage space, and wherein the trunk lid is pivotable by a second pivot device independently of the convertible top hatch for opening the trunk; and wherein a lock arrangement is provided by which the convertible top, in said intermediate position, is locked against motion out of the intermediate position.

3. Cabriolet vehicle, comprising;

a vehicle body having a passenger compartment and a trunk space with a trunk lid, part of the trunk space constituting a stowage space;

a convertible top;

a convertible top hatch forming part of the trunk lid; and a convertible top which is movable between a closed position in which it covers the passenger compartment and a stowage position in which the convertible top is held as a folded package in the stowage space covered by the convertible top hatch, the convertible top having an intermediate position in which the folded package is raised through the stowage space opening by moving of the convertible top hatch into a loading position and projects out of the stowage space;

wherein the convertible top hatch is pivotable by a first pivot device for opening of the stowage space, and wherein the trunk lid is pivotable by a second pivot device independently of the convertible top hatch for opening the trunk; and wherein a lock arrangement is provided by which the convertible top hatch, in its loading position, is locked against motion out of the loading position.

4. Cabriolet vehicle, comprising:

a vehicle body having a passenger compartment and a trunk space with a trunk lid, part of the trunk space constituting a stowage space;

a convertible top;

a convertible top hatch forming part of the trunk lid; and a convertible top which is movable between a closed position in which it covers the passenger compartment and a stowage position in which the convertible top is held as a folded package in the stowage space covered by the convertible top hatch, the convertible top having an intermediate position in which the folded package is raised through the stowage space opening by moving of the convertible top hatch into a loading position and projects out of the stowage space;

wherein the convertible top hatch is pivotable by a first pivot device for opening of the stowage space, and wherein the trunk lid is pivotable by a second pivot device independently of the convertible top hatch top opening the trunk; and wherein the convertible top is connected to the motor vehicle body via a convertible top-connecting rod mechanism which is coupled to the vehicle body; wherein the convertible top hatch is connected to the motor vehicle via a hatch-connecting rod mechanism which is coupled to the vehicle body, and wherein the trunk lid is coupled via a lid-connecting rod mechanism which is coupled to the convertible top hatch.

5. Cabriolet vehicle in accordance with claim 4, wherein the convertible top-connecting mechanism, the hatch-connecting mechanism and the lid-connecting rod mechanism are adjustable independently of one another.

6. Cabriolet vehicle in accordance with claim 5, wherein a connecting rod of the convertible top-connecting rod mechanism which is connected to the vehicle body, and a connecting rod of the hatch-connecting rod mechanism which is coupled to the vehicle body, are connected to a respective drive device which is supported securely on the vehicle body.

7. Cabriolet vehicle in accordance with claim 6, wherein at least one locking mechanism on at least one of the convertible top, the convertible top hatch, the convertible top-connecting rod mechanism, the hatch-connecting rod mechanism and the respective drive devices.

8. Cabriolet vehicle in accordance with claim 6, wherein a locking mechanism is provided on at least one of the convertible top and the convertible top hatch, said locking mechanism comprising a catch mechanism having a catch element which is pre-tensioned in a catching direction.

9. Cabriolet vehicle in accordance with claim 8, wherein a release device is provide on said catch mechanism for releasing the catch.

10. Cabriolet vehicle in accordance with claim 9, wherein said release device is a switchable magnet.

11. Cabriolet vehicle in accordance with claim 8, wherein the locking mechanism has a locking element which is displaceable by a regulating device between a locking position and a release position.

12. Cabriolet vehicle, comprising:

a vehicle body having a passenger compartment and a trunk space with a trunk lid, part of the trunk space constituting a stowage space;

a convertible top;

a convertible top hatch forming part of the trunk lid; and a convertible top which is movable between a closed position in which it covers the passenger compartment and a stowage position in which the convertible top is held as a folded package in the stowage space covered by the convertible top hatch, the convertible top having an intermediate position in which the folded package is raised through the stowage space opening by moving of the convertible top hatch into a loading position and projects out of the stowage space;

wherein a lock mechanism is provided, said lock mechanism being arranged on one of the convertible top, in said intermediate position, for preventing motion out of the intermediate position and the convertible top hatch, in its loading position, for preventing motion out of the loading position.

13. Cabriolet vehicle in accordance with claim 12, wherein the locking mechanism comprises a catch mechanism having a catch element which is pre-tensioned in a catching direction.

14. Cabriolet vehicle in accordance with claim 13, wherein a release device is provided on said catch mechanism for releasing the catch.

15. Cabriolet vehicle in accordance with claim 14, wherein said release device is a switchable magnet.

16. Cabriolet vehicle in accordance with claim 12, wherein the locking mechanism has a locking element which is displaceable by a regulating device between a locking position and a release position.

* * * * *